United States Patent [19]

Radford et al.

[11] 4,146,463
[45] Mar. 27, 1979

[54] REMOVAL OF CARBON MONOXIDE AND SULFUR OXIDES FROM REFINERY FLUE GASES

[75] Inventors: Herschel D. Radford, Flossmoor, Ill.; Gerard J. D'Souza, Seabrook, Tex.

[73] Assignee: Standard Oil Company (Indiana), Chicago, Ill.

[21] Appl. No.: 731,949

[22] Filed: Oct. 12, 1976

[51] Int. Cl.² .............. C01B 17/00; C10G 11/00; B01D 15/06
[52] U.S. Cl. .................. 208/120; 423/244; 208/113; 208/164; 252/417
[58] Field of Search .......... 423/563 R, 244; 208/120, 113, 164; 252/417

[56] References Cited
U.S. PATENT DOCUMENTS 3,810,972  5/1974  Humphrey et al. ............ 423/563 R
4,071,436  1/1978  Blanton et al. ................ 208/120

Primary Examiner—O. R. Vertiz
Assistant Examiner—Gary P. Straub
Attorney, Agent, or Firm—Richard A. Kretchmer; Arthur G. Gilkes; William T. McClain

[57] ABSTRACT

A cyclic fluidized catalytic cracking process is operated with a cracking catalyst which is modified with one or more metal oxides capable of reacting with sulfur oxides in the regeneration zone wherein the catalyst is regenerated under conditions which result in substantially complete conversion of carbon monoxide to carbon dioxide. Tail gases and flue gases from refinery furnaces which contain carbon monoxide and sulfur oxides are conveyed to the regeneration zone where they are scrubbed by the modified catalyst. The sulfur oxides are absorbed and the carbon monoxide is converted to carbon dioxide in the regeneration zone.

26 Claims, 1 Drawing Figure

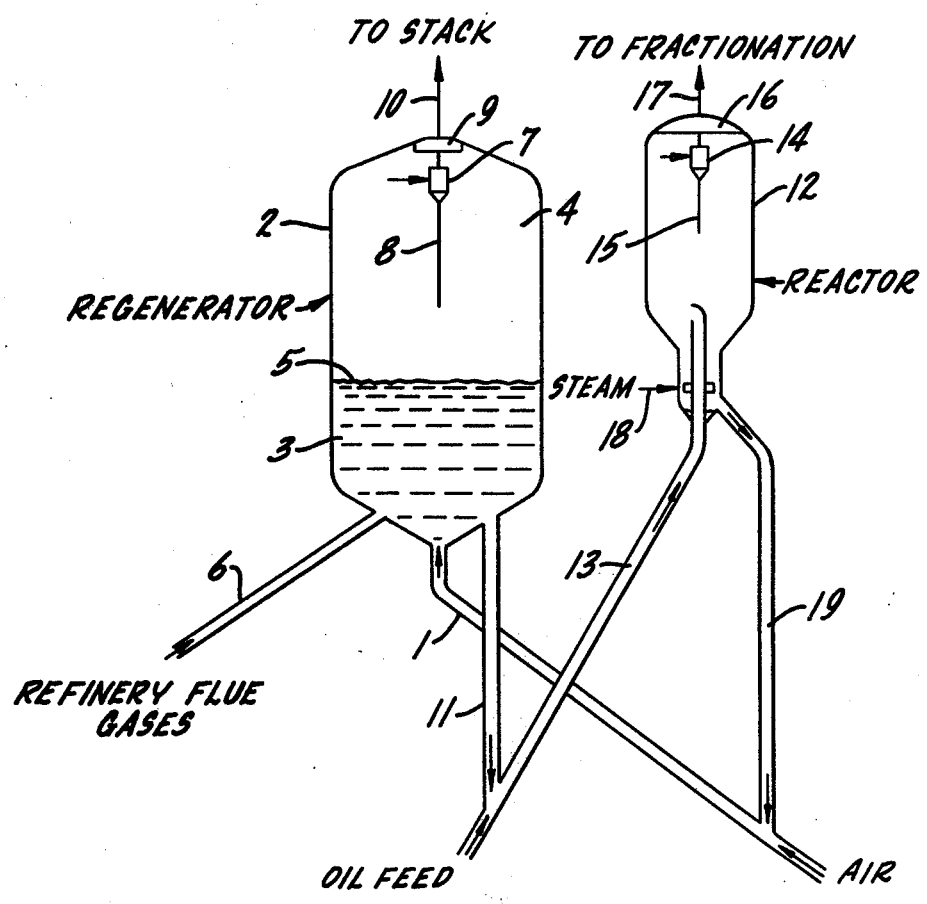

REMOVAL OF CARBON MONOXIDE AND SULFUR OXIDES FROM REFINERY FLUE GASES

BACKGROUND OF THE INVENTION

A major industrial problem involves the development of efficient methods for reducing the concentration of air pollutants, such as carbon monoxide and sulfur oxides, in waste gas streams from the processing and combustion of fuels. Specifically, refinery operations associated with the fluidized catalytic cracking of petroleum and petroleum derivatives typically result in the production of waste gas streams which contain relatively high levels of both carbon monoxide and sulfur oxides. The present invention is directed to a method for the reduction of these emissions without the need for complex and expensive waste gas treatment facilities.

Catalytic cracking of heavy petroleum fractions is one of the major refining operations employed in the conversion of crude petroleum oils to useful products such as the fuels utilized by internal combustion engines. Illustrative of fluidized catalytic cracking processes is the method wherein suitably preheated high molecular weight hydrocarbon liquids and vapors are contacted with hot, finely-divided, solid catalyst particles, either in a fluidized bed reactor or in an elongated riser reactor, and maintained at an elevated temperature in a fluidized or dispersed state for a period of time sufficient to effect the desired degree of cracking to lower molecular weight hydrocarbons. Suitable hydrocarbon feeds generally boil within the range from about 400° to about 1,200° F. and are usually cracked at temperatures ranging from 850° to 1,050° F.

In a catalytic process of this type, some non-volatile carbonaceous material or coke is deposited on the catalyst particles. Coke comprises highly condensed aromatic hydrocarbons which generally contain 4 to 10 weight percent hydrogen. As coke accumulates on the catalyst surfaces, the catalyst activity and selectivity diminish.

Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from catalyst surfaces with an oxygen containing gas such as air. The oxidation of these carbonaceous deposits of coke may be regarded, in a simplified manner, as the oxidation of carbon according to the following equations:

(1) $C + O_2 \rightarrow CO_2$ (2) $2C + O_2 \rightarrow 2CO$ (3) $2CO + O_2 \rightarrow 2CO_2$ Reactions (1) and (2) both occur under typical catalyst regeneration conditions wherein the catalyst temperature may range from about 1,050° to about 1,300° F. The combustion of carbon monoxide to carbon dioxide according to reaction (3) proceeds only at temperatures above about 1,100° F. Consequently, the incomplete combustion of carbon monoxide during catalyst regeneration can result in significant concentrations of carbon monoxide in the regeneration zone effluent gas. The discharge of this carbon monoxide into the atmosphere is undesirable, not only from an environmental point of view, but also because it represents a wasted source of heat energy. The combustion of carbon monoxide yields approximately 4,350 B.T.U. per pound.

When high-sulfur feedstocks, such as petroleum hydrocarbons containing sulfur compounds, are utilized in a catalytic cracking unit, the coke deposited on the catalyst contains sulfur. During regeneration of the coked deactivated catalyst, the coke is burned from the catalyst surfaces and results in conversion of the sulfur to sulfur dioxide together with small amounts of sulfur trioxide. These sulfur oxides are thus discharged in the regeneration zone effluent gas stream. The processing of a high-sulfur feedstock often results in emissions of sulfur oxides in the regeneration zone effluent which are in the range of about 1,200 parts per million.

Although catalyst regeneration operations typically generate substantial emissions of carbon monoxide and sulfur oxides, other refinery operations also produce significant quantities of these undesirable emissions. Waste gas streams from boilers and other process furnaces in the refinery typically contain undesirable emissions of carbon monoxide and sulfur oxides. Refinery tail gases may also contain emissions of carbon monoxide and sulfur oxides.

A variety of methods have been described for removing sulfur oxides from waste gas streams. These include aqueous washing or scrubbing, chemical absorption, neutralization, and chemical reaction or conversion. These methods are not entirely satisfactory, however. Unfortunately, they all require complex and expensive auxiliary equipment which results in increased operating and capital costs.

Another approach, which is limited to the removal of sulfur oxides from the regenerator effluent gas stream in a cyclic fluidized catalytic cracking process, is set forth in U.S Pat. No. 3,835,031. This approach contemplates the use of a molecular sieve type cracking catalyst which is impregnated with one or more Group IIA metal oxides. The metal oxides react with sulfur oxides in the regeneration zone to form non-volatile inorganic sulfur compounds. These non-volatile inorganic sulfur compounds are then converted to hydrogen sulfide in the reactor and stripper zones of the cyclic process. The hydrogen sulfide is removed by conventional means. Similarly, U.S. patent applications Ser. No. 642,541; 642,542; 642,544; and 642,545 also contemplate the elimination of sulfur oxides from catalyst regenerator effluent gas by the use of a molecular sieve type catalyst in combination with a metal-containing component which reacts with sulfur oxides.

Still another approach, which is also limited to the removal of sulfur oxides from the regenerator effluent gas stream in a cyclic fluidized catalytic cracking process, is set forth in U.S. Pat. No. 3,699,037. This approach involves the addition of at least a stoichiometric amount of a calcium or magnesium compound to the cracking cycle in relation to the amount of sulfur deposited on the catalyst. This added material is intended to react with the resulting sulfur oxides and then, being in a finely divided condition, exit from the cracking cycle as particulate material in the regenerator effluent gas stream. Continued addition of such material obviously increases operating costs, and merely substitutes one form of pollutant for another.

The removal of carbon monoxide from waste gas streams has been accomplished through the use of carbon monoxide boilers and associated means for recovery of the energy released by conversion of the carbon monoxide to carbon dioxide. Such methods, however, require complex auxiliary equipment which serves to increase operating and capital costs.

The removal of carbon monoxide from regenerator effluent gas streams in cyclic fluidized catalytic cracking processes has been the subject of substantial inventive effort. U.S. Pat. No. 3,909,392 describes the essentially complete oxidation of carbon monoxide to carbon dioxide within the regenerator vessel under conditions which permit substantially complete recovery of the evolved heat by direct transfer to catalyst particles. This patent also discloses the use of oxidation promoters within the regeneration zone, which serve to accelerate the combustion of carbon monoxide. Similarly, Belgian Pat. No. 826,266 is directed to a method which involves a catalytic cracking catalyst in physical association with a carbon monoxide-oxidation promoter which is a metal having an atomic number of at least 20 and may be selected from Groups IB, IIB, and III to VIII of the Periodic Table. Further, U.S. Pat. No. 3,808,121 discloses the regeneration of a cracking catalyst in the presence of a carbon monoxide-oxidation promoter which is retained in the regeneration zone.

Belgian Pat. No. 7,412,423 discloses that a cracking catalyst containing less than 100 parts per million, calculated as metal and based on total catalyst, of at least one metal component selected from the group consisting of metals selected from Periods 5 and 6 of Group VIII of the Periodic Table, rhenium, and compounds thereof, is effective in reducing the carbon monoxide content of effluent gases derived from the regeneration of catalytic cracking catalysts.

U.S. Pat. applications Ser. No. 642,542 and 642,545 describe the reduction of carbon monoxide levels in effluent gases from the regeneration of catalytic cracking catalyst through the use of a cracking catalyst which is combined with a carbon monoxide-oxidation promoter and a metal-containing component which reacts with sulfur oxides. In addition, U.S. patent application Ser. No. 642,533 contemplates the use of a carbon monoxide-oxidation promoter and an oxidation stabilizer to reduce carbon monoxide levels in effluent gases derived from catalyst regeneration.

Although relatively simple and inexpensive methods are now available for the control of emissions of carbon monoxide and sulfur oxides derived from catalyst regeneration in cyclic fluidized catalytic cracking processes, such methods are not available for the control of such emissions in tail gases or waste gas streams from boilers and other process furnaces associated with the refinery. The method used for reducing these emissions should not be dependent upon the nature of the fuel undergoing combustion and should permit full utilization of the heat energy available through combustion of the carbon monoxide emissions. It is also necessary that the method selected not substitute one form of undesirable waste for another, such as reducing emissions of sulfur oxides coupled with an increase in particulate emission. It is further desirable that the method of control not require significant operating or capital costs. Finally, it is critical that the method selected for reducing such emissions be effective without lowering the activity and selectivity of the cracking catalyst.

SUMMARY OF THE INVENTION

The invention is directed to an improved cyclic fluidized catalytic cracking process which is characterized by reduced emissions of carbon monoxide and sulfur oxides in refinery waste gas streams. The invention provides for the substantial reduction of these emissions in tail gases and in waste gas streams originating from boilers and other process furnaces in the refinery.

In accordance with the present invention, waste gas streams containing emissions of sulfur oxides and carbon monoxide are conveyed to the regeneration zone. These waste gas streams are then passed through the bed of cracking catalyst in the regeneration zone where they are scrubbed by contact with the catalyst as it undergoes regeneration. The catalyst employed in the process is modified with a metal oxide component which is capable of reacting with sulfur oxides to yield non-volatile inorganic sulfur compounds. The metal oxide component can either be deposited on or incorporated into the catalyst. Alternatively, the metal oxide component can be mixed with the catalyst and circulated with it through the cracking process cycle. Conditions are employed in the cracking process cycle such that stable, non-volatile inorganic sulfur compounds are formed in the regeneration zone. These inorganic sulfur compounds are then reduced in the reaction zone and withdrawn, in the form of hydrogen sulfide, from the reaction and stripping zones. As a consequence, the content of sulfur oxides in the scrubbed waste gas streams is decreased substantially.

In several preferred embodiments, the invention permits essentially complete combustion of carbon monoxide emissions in the regeneration zone coupled with conservation of the heat evolved. The heat produced by this combustion is absorbed by the catalyst particles, which are then circulated to the reaction and stripping zones before returning to the regeneration zone.

In one embodiment, the catalyst-metal oxide system may be further modified with an oxidation promoter which serves to catalyze the conversion of carbon monoxide to carbon dioxide in the regeneration zone. The oxidation promoter also serves to further improve the removal of sulfur oxides from the waste gas stream. The oxidation promoter may be either deposited on or incorporated into the catalyst particles. Alternatively, the oxidation promoter may be separate from the catalyst particles and may either be confined to the regeneration zone or circulated through the cracking process cycle.

An outstanding advantage of the invention rests in the fact that an existing and required step of the cyclic cracking process is utilized to scrub emissions of sulfur oxides and carbon monoxide from waste gas streams. Consequently, expensive auxiliary equipment is unnecessary. In addition, the process of the invention provides a regenerated catalyst which generally possesses activity and selectivity characteristics which closely approach those of fresh catalyst.

DESCRIPTION OF THE DRAWING

The attached drawing is a diagrammatic representation of one embodiment suitable for removing carbon monoxide and sulfur oxides according to the process of this invention.

DETAILED DESCRIPTION OF THE INVENTION

The invention is an improved cyclic fluidized catalytic cracking process which permits a substantial reduction in emissions of carbon monoxide and/or sulfur oxides from waste gas streams which are generated by any refinery operation. The cyclic, fluidized, catalytic cracking process is of the type which comprises the following steps:

(1) An organic feedstock is subjected to cracking in a reaction zone with fluidized solid particles of a cracking catalyst;

(2) Catalyst which has become substantially deactivated by non-volatile coke deposits is separated from reaction zone effluent and stripped of volatile deposits in a stripping zone by contact with a stripping gas which contains steam;

(3) Stripped catalyst particles are then separated from stripping zone effluent and regenerated in a regeneration zone by combustion of the coke deposits with an oxygen containing gas; and (4) Regenerated catalyst particles are separated from regeneration zone effluent gas and recycled to the reaction zone.

The improvement comprises conveying at least one waste gas stream containing carbon monoxide and/or sulfur oxides to the regeneration zone where it is contacted with catalyst particles which are undergoing regeneration. The catalyst employed is modified with at least one metal oxide which is capable of reacting with sulfur oxides in the regeneration zone to form non-volatile sulfur compounds. The modifying metal oxide is utilized in sufficient amount to reduce the concentration of sulfur oxides in the waste gas stream. In a preferred embodiment of the invention, the waste gas stream is additionally mixed with excess oxygen-containing gas in the regeneration zone. Substantially complete combustion of carbon monoxide in the waste gas stream is then effected in the regeneration zone in the presence of a sufficient amount of catalyst particles to absorb a major portion of the heat derived from combustion of said carbon monoxide and of the coke deposits. The cracking catalyst may, advantageously, be further modified with sufficient amounts of an oxidation promoter to improve the removal of sulfur oxides and to accelerate the combustion of carbon monoxide in the waste gas stream.

Suitable catalysts include any high-activity fluidizable cracking catalyst which can be effectively regenerated under the selected conditions. Preferred catalysts include those of the molecular sieve type wherein the catalyst particles contain from about 0.5 to about 50 weight percent of "molecular sieves" or crystalline aluminosilicates distributed throughout a matrix composed of at least one material selected from the group consisting of silica, alumina, zirconia, thoria, and boria. Preferred catalyst matrices include those derived from silica and/or alumina. A highly suitable matrix contains from about 10 to about 65 weight percent of alumina and from about 35 to about 90 weight percent of silica. Admixtures of clay-extended aluminas may also be employed.

The catalysts may be prepared by any suitable method, such as milling, cogelling, and the like, subject only to the requirement that finished catalyst be in a physical form capable of fluidization. The solid particles of finished catalyst are finely divided and, desirably, have an average particle size in the range of from about 20 microns or less to about 150 microns.

Suitable molecular sieves include both naturally occurring and synthetic aluminosilicate materials such as faujasite; chabazite; X-type and Y-type aluminosilicate materials; and ultrastable, large-pore, crystalline aluminosilicate materials. These aluminosilicates are usually available or made in the sodium form. The amount of sodium ions contained therein is ordinarily reduced to the smallest value possible, generally less than about 0.30 weight percent, through ion exchange with hydrogen-precursors such as ammonium ions, or polyvalent metals ions including calcium, strontium, barium, and the rare earths such as cerium, lanthanium, neodyminium and their mixtures. The usable aluminosilicates are able to maintain their pore structure under the high temperature conditions of catalyst manufacture, hydrocarbon processing, and catalyst regeneration. These materials have a uniform pore structure of exceedingly small size, the cross-section diameter of the pores being in the range from about 6 to about 20 angstroms, preferably from about 10 to about 15 angstroms.

Suitable catalysts are modified with at least one metal oxide which reacts with sulfur oxides in the regeneration zone to form non-volatile inorganic sulfur compounds. Suitable metal oxides include those selected from the group consisting of the oxides of sodium, the Group IIA metals of the Periodic Table, scandium, titanium, chromium, iron, molybdenum, manganese, cobalt, nickel, antimony, copper, zinc, cadmium, lead, and the rare earth metals. The metal oxides are preferably selected from the group consisting of the oxides of sodium, calcium and magnesium. More preferably, the metal oxides are selected from the group consisting of the oxides of calcium and magnesium.

The metal oxide or oxides are employed in sufficient average amounts to provide reduced emissions of sulfur oxides in the waste gas stream. The amount of metal oxide utilized, calculated as the metal, is ordinarily in the range from about 10 parts per million to about 10 weight percent based on the combined weight of metal oxide and catalyst particles. It is understood that activity in reducing emissions of sulfur oxides in the waste gas stream may vary from metal oxide to metal oxide. Table I sets forth approximate ranges for the preferred, more preferred and most preferred amount of each metal oxide, calculated as the metal and based upon the combined weight of catalyst particles and metal oxide.

Table I.

| Metal Oxide | Preferred Amount | More Preferred Amount | Most Preferred Amount |
| --- | --- | --- | --- |
| Sodium | 0.6% - 3% | 0.8% - 2% | 0.85% - 1.5% |
| Group IIA Metal | 25 ppm - 7% | 0.01% - 5% | 0.1% - 0.5% |
| Zinc | 25 ppm - 7% | 0.01% - 5% | 0.01% - 0.5% |
| Cadmium | 25 ppm - 7% | 0.01% - 5% | 0.01% -0 0.5% |
| Manganese | 25 ppm - 7% | 0.01% - 5% | 0.01% - 0.5% |
| Scandium | 25 ppm - 7% | 0.01% - 5% | 0.01% - 0.5% |
| Cobalt | 25 ppm - 7% | 0.01% - 5% | 0.01% - 0.5% |
| Titanium | 10 ppm - 10% | 0.5% - 1% | 0.5% - 0.8% |
| Chromium | 10 ppm - 1% | 0.01% - 0.1% | 0.01% - 0.025% |
| Lead | 10 ppm - 1% | 0.01% - 0.1% | 0.01% - 0.025% |
| Antimony | 10 ppm - 1% | 0.01% - 0.1% | 0.01% - 0.025% |
| Iron | 50 ppm - 5% | 0.1% - 1% | 0.3% - 0.8% |
| Nickel | 10 ppm - 10% | 50 ppm - 0.5% | 50 ppm - 0.1% |
| Copper | 10 ppm - 10% | 50 ppm - 0.1% | 50 ppm - 250 ppm |
| Rare Earth Metal | 0.2% - 10% | 2% - 6% | 2% - 4% |

The metal oxide may be in the form of a fluidizable powder which is mixed with the catalyst particles and circulated through the catalytic cracking process cycle.

The use of such a powdered metal oxide is advantageous since it is easy to add to and handle in a fluidized catalytic cracking process system. The particle size of the powder should be selected so that segregation of the particles does not take place at fluidizing velocities. Desirably, the particles are not so minute that excessive emission occurs with the gases from the bed as entrained particulate matter. The particles should also be sufficiently strong that excessive attrition and degradation of the sized particles does not take place. The average particle size of the metal oxide powder may be from about 0.5 to 100 microns, preferably less than about 50 microns in diameter. Microsized particles having an average particle size of less than about 1 micron, for instance, about 0.01 to 0.5 micron, may tend to form aggregates of larger size which may beneficially be employed in the process of this invention. Illustrative of powdered metal oxides which may be employed in this ivention are ferric oxide, ferrous oxide, ferric and zinc oxide, manganese dioxide, and cerium oxide.

Alternatively, the metal oxide may be incorporated into or deposited onto a suitable support. Such support can be an amorphous cracking catalyst or a solid which is substantially inert to the cracking reaction. In this case, the supported metal oxide is then mixed with a molecular sieve type cracking catalyst, and the mixture utilized in the fluidized cracking process. Desirably, the support is porous and frequently has a surface area, including the area of the pores open to the surface, of at least about 10 and preferably at least about 50 square meters per gram. Illustrative of suitable supports are silica, alumina and mixtures of silica and alumina.

The metal oxide may also be incorporated into or deposited onto the solid catalyst particles. In such case, care should be taken in selection of the method of incorporation so that the cracking activity and selectivity of the cracking catalyst are not adversely affected. It is preferred, if the catalyst is a molecular sieve type having ion-exchanged sites, that the ion-exchange be completed prior to incorporation or deposit of the metal oxide.

In any of the above cases, the precise manner in which the metal of the metal oxide is incorporated into or deposited onto the molecular seive-type cracking catalyst, amorphous cracking catalyst, or substantially inert substrate is not known with absolute certainty. The metal may enter into a complex chemical combination with the carrier material. Therefore, it is understood that use of the terms "metal oxide" and "incorporated into" or "deposited onto" a substrate connotes not only the free metal oxides but also includes the metals in their elemental state and in complex chemical combination with the substrate material.

The metal of the metal oxide may be combined with the substrate either during or after preparation of the substrate. One method of preparing the metal oxide for use in the invention consists of impregnating a suitable support with an aqueous or organic solution or dispersion of a compound or compounds of the metal in the metal oxide. The impregnation may be practiced in any way which will not destroy the structure of the substrate. After drying, the composite may be either calcined or introduced directly into the catalytic cracking process cycle to afford the metal oxide modified support of the invention. Preferably, water soluble nitrate salts are employed in the impregnating solution since residue from the thermal decomposition of nitrate salts is relatively innocuous to the activity of the hydrocarbon cracking catalyst. The halogen and sulfate salts may also be used, but by-products produced during thermal degradation of the salt may be deleterious to the activity of the cracking catalyst. Consequently, the halogen and sulfate salts are used, most frequently, in combination with substrates which are substantially inert to the cracking reaction and which do not significantly affect the hydrocarbon cracking reaction.

Another method of physically depositing the metal oxide on a substrate, particularly porous substrates such as crystalline alumino-silicates, is adsorption of a fluid compound or compounds of the metal in the metal oxide on the substrate followed by thermal or chemical decomposition of the compound or compounds. The substrate may be activated by heating to remove any adsorbed water prior to contact with a fluid compound or compounds of the metal in the metal oxide. Suitable compounds include metal carbonyls, metal alkyls, volatile metal halides and the like. The adsorbed compound or compounds may then be reduced thermally or chemically to the metal oxide. Thermal reduction may be effected, for example, by calcination or in the regeneration zone of the cracking process cycle.

Both impregnation and adsorption can be performed with a substrate before it is introduced into the cracking process cycle. However, it is also advantageous to introduce a compound or compounds of the metal in the metal oxide into the cracking process cycle and thereby depositing the metal oxide onto the substrate in situ. Such compound or compounds may be introduced as an aqueous or organic solution or dispersion, or in the solid, liquid or gaseous state at any stage of the cracking process cycle. For example, such compound or compounds can be admixed either with the feedstock or fluidizing gas in the reaction zone, with the regeneration gas, torch oil or water in the regeneration zone, or with the stripping gas in the stripping zone, or can be introduced as a separate stream. Suitable compounds for in situ incorporation include metal salts, organometallic compounds, metal diketonates, carbonyls, metallocenes, olefin complexes of 2 to 20 carbons, acetylene complexes, alkyl or aryl phosphine complexes and carboxylates of 1 to 20 carbon atoms.

The key features of activity and stability are more easily attainable by introducing the metal oxide or metal oxide precursor into the cracking process cycle and thereby modifying the catalyst with it in situ, rather than compositing it with the cracking catalyst during catalyst manufacture. The in situ modification has been found to result in a greater reduction in emissions of sulfur oxides. Incorporating the metal oxide or metal oxide precursor during the cracking process cycle is also advantageous since it permits a larger degree of control over any possible deleterious effects of such metal oxide on the cracking reaction. In addition, since metal oxide can be lost as fines through attrition of the modified cracking catalyst, the addition of metal oxide or metal oxide precursor to the cracking process cycle provides a simple method for the maintenance of a desired amount of metal oxide.

Catalytic cracking of a selected petroleum feedstock is effected, preferably, in one or more fluidized transport reactors at a temperature and fluidizing velocity which limits the conversion time to not more than about ten seconds. The cracking reaction temperature is preferably in the range of from about 850° F. to about 1,200° F.

Deactivated catalyst from the reaction zone is stripped of volatile deposits before regeneration. The stripping zone may be suitably maintained at a temperature in the range from about 850° to about 1,200° F. and preferably from about 870° to about 1,100° F. The preferred stripping gas is steam, although steam mixed with flue gas or with inert gases such as nitrogen may also be used. The stripping gas is introduced at a pressure in the range from about 10 to about 35 p.s.i.g., which is suitable to effect substantially complete removal of volatile deposits from the deactivated catalyst. The weight ratio of steam to catalyst which is supplied to the stripping vessel is in the range of from about 0.0005 to about 0.025 and preferably in the range of from about 0.0015 to about 0.0125.

Catalyst regeneration is accomplished by burning the coke deposits from the catalyst surface with a molecular oxygen-containing gas such as air. The oxygen containing gas may contain diluent gases such as nitrogen, steam, carbon dioxide, recycled regenerator effluent gas, and the like. The oxygen concentration of the regeneration gas is ordinarily from about 2 to 30 volume percent and preferably from about 5 to 25 volume percent. Since air is conveniently employed as a source of oxygen, a major portion of the inert gas may be nitrogen. The regeneration zone temperatures are ordinarily in the range from about 1,050° to about 1,450° F. and are preferably in the range of from about 1,180° to about 1,350° F.

Waste gas streams containing sulfur oxides and/or carbon monoxide from refinery operations are conveyed to the regeneration zone and are passed through the bed of metal oxide modified catalyst as it undergoes regeneration. The sulfur oxides contained in the waste gas streams are then removed upon contact with the modified catalyst. In effect, the sulfur oxides are "scrubbed" out of the waste gas stream in the catalyst regeneration zone.

The waste gas streams containing sulfur oxides and/or carbon monoxide may originate from the combustion of any fuel. Such fuels include both high and low sulfur liquid fuels, coke, and both high and low sulfur coal. Consequently, the waste gas streams from boilers and other process furnaces in the refinery, as well as tail gases, may be utilized according to the invention. Other typical gases such as oxygen, nitrogen, carbon dioxide, and water vapor may also be present in the waste gas streams. In those instances where the waste gas streams contain a solid waste material such as fly ash, the gas may be subjected to a preliminary treatment to remove such solid materials.

The use of a metal oxide modified cracking catalyst, according to the invention, has little effect upon the proportion of petroleum feedstock converted to coke. In addition, the cracking activity and selectivity normally present in the unmodified catalyst remains substantially unaffected by the modifying metal oxide. The cracking catalyst and modifying metal oxide of the invention possess separate and essential functions. The cracking catalyst serves to catalyze the cracking of feedstock, whereas the modifying metal oxide is substantially inert with respect to the cracking reaction. In contrast, the modifying metal oxide serves to absorb sulfur oxides in the regeneration zone.

Although the disclosed process is not to be limited thereby, it is believed that the metal oxide or metal oxides used to modify the catalyst react with the sulfur oxides in the regeneration zone to form non-volatile, inorganic, sulfur containing compounds, such as sulfates and sulfites. Consequently, the sulfur oxides are rendered unavailable for exhaust as emissions in the regeneration zone effluent gas. The resulting non-volatile, inorganic, sulfur containing compounds are then conveyed to the reaction zone together with substantially regenerated catalyst particles. Under the reducing conditions present in the reaction zone, the non-volatile, inorganic, sulfur containing compounds are converted to metal sulfides. These metal sulfides are conveyed to the stripping zone together with substantially deactivated catalyst particles. Upon stripping with a steam containing gas, the metal sulfides are hydrolyzed to hydrogen sulfide and to the corresponding metal oxides. Alternatively, the metal sulfides may undergo partial or complete hydrolysis in the reaction zone. As a result of hydrolysis, the modifying metal oxides are again made available for reaction with sulfur oxides in the next regeneration cycle. The resulting hydrogen sulfide is recovered together with the other volatile products from the reaction and stripping zones and is separated and may be converted to elemental sulfur in conventional facilities.

These reactions may be summarized as follows:

(1) Regeneration Zone (a) $M_xO + SO_2 + \frac{1}{2}O_2 \rightarrow M_xSO_4$ (b) $M_xO + SO_3 \rightarrow M_xSO_4$ (c) $M_xO + SO_2 \rightarrow M_xSO_3$ (2) Reaction Zone (a) $M_xSO_4 + 4H_2 \rightarrow M_xS + 4H_2O$ (b) $M_xSO_3 + 3H_2 \rightarrow M_xS + 3H_2O$ (c) $M_xS + H_2O \rightarrow M_xO + H_2S$ (3) Stripping Zone $M_xS + H_2O \rightarrow M_xO + H_2S$ where M is the metal of the metal oxide and x is the ratio of the oxidation state of the oxide ion to the oxidation state of the metal in the metal oxide when combined with oxygen.

The drawing is illustrative of one embodiment of the invention. Combustion air flows through line 1 into the bottom of regeneration vessel 2 and discharges into a dense bed of metal oxide modified catalyst particles 3 which are fluidized by the air flow. Combustion of coke contained on the spent catalyst is initiated within the fluidized dense bed of metal oxide modified catalyst. Fluidizing gases continuously carry some of the solid particles upward into the dilute phase zone which occupies the upper section 4 of the regenerator vessel, that is, the section above the phase interface 5. Combustion of coke continues in the dilute phase zone. A waste gas stream containing sulfur oxides and carbon monoxide flows through inlet line 6 and discharges into the dense bed of metal oxide modified catalyst particles. The sulfur oxides are removed upon contact with the modified catalyst particles in both the dense and dilute phase zones of the regeneration. The resulting scrubbed waste gas stream and gases resulting from combustion of coke together with entrained solid particles are withdrawn into cyclone separator 7. The solid particles are separated in the cyclone and returned to the regenerator vessel through line 8. Substantially spent combustion gas together with scrubbed waste gas then passes into plenum 9 and is discharged from the regenerator vessel through line 10. Regenerated particles of modified catalyst are withdrawn through line 11 and are conveyed, together with feedstock, to the reactor vessel 12 through transfer line 13. Petroleum feedstock undergoes cracking in the transfer line and reactor, and the reactor effluent together with entrained solid particles are withdrawn into cyclone separator 14. Solid particles are separated in the cyclone and are returned to the reactor vessel through line 15. Reactor effluent then passes into plenum 16 and is discharged from the reactor vessel through line 17. This effluent is subsequently fractionated by conventional means, and the hydrogen sulfide derived from sulfur oxides in the waste gas stream is separated. Modified catalyst, which is substantially deactivated by coke deposits, is stripped in the lower section of the reaction vessel with steam which is introduced through line 18. The stripped deactivated catalyst is then withdrawn through line 19 and is returned to the regenerator vessel, together with combustion air, through line 1.

Preferred embodiments of the method of this invention involve operation in conjunction with the regeneration scheme of U.S. Pat. No. 3,909,392. U.S. Pat. No. 3,909,392, incorporated in its entirety by reference, is directed to an improved method for the regeneration of catalysts which are employed in the cyclic fluidized catalytic cracking of hydrocarbon feedstocks. The process permits the reduction of coke levels on regenerated catalyst to extremely low values while simultaneously maintaining a favorable heat balance in the cracking cycle and providing an effluent gas stream having an extremely low carbon monoxide content. Heat from the combustion of carbon monoxide is absorbed by the regenerated catalyst and provides part of the process heat required in the hydrocarbon conversion zone. In one embodiment of the process of that patent, the combustion of carbon monoxide to carbon dioxide is carried substantially to completion within the regeneration vessel in a relatively dilute secondary catalyst regeneration zone, advantageously at a temperature between about 1,200° and 1,500° F., desirably between about 1,250° and 1,450° F. The temperature of the secondary zone may be about 50° or 100° F. higher than that of the first regeneration zone. Partially regenerated catalyst from a relatively dense primary catalyst regeneration zone can be controllably flowed through the secondary zone in an amount and at a rate sufficient to absorb substantially all of the heat released by the combustion occurring in the secondary zone. Although most of the coke is burned from the catalyst in the primary zone, additional coke is burned from the partially regenerated catalyst while present in the secondary zone, and catalyst substantially free of coke may be recovered for recycle to the hydrocarbon conversion zone.

In a second embodiment of the process of U.S. Pat. No. 3,909,392 substantially all of the combustion, including both the oxidation of coke on the catalyst and the oxidation of carbon monoxide, occurs within a single relatively dense regeneration zone in response to the proper control, primarily, of the regeneration temperature and gas velocity.

Similarly, when the process of the present invention is operated in embodiments involving the regeneration scheme of U.S. Pat. No. 3,909,392, the major amount of heat liberated from the combustion of carbon monoxide, including that present in the waste gas streams which are injected into the regeneration zone, is absorbed by the metal oxide modified catalyst particles. Beneficially, in such embodiments of the present invention, considerable coke and carbon monoxide is combusted in a dense phase zone. As the portion of combustion occurring in the dense phase zone is increased, the evolution of heat in the dilute phase zone is substantially reduced and the need to provide rapid turnover of solid particles in the dilute phase zone to absorb the evolved heat is reduced or eliminated.

In such embodiments, the process of the present invention permits substantial or complete removal of carbon monoxide from waste gas streams. The process can result in an effluent gas stream from the regeneration zone which has a carbon monoxide content of less than about 0.2 volume percent, for example about 500 to 1,000 ppm, and as low as from about 0 to 500 ppm. In effect, the carbon monoxide is scrubbed from the refinery waste gas streams upon passage through the regeneration zone. These embodiments also permit the generation of reactivated catalyst having coke deposits which are lower than about 0.2 weight percent and preferably less than about 0.05 weight percent.

When the process of the present invention is operated in embodiments involving the regeneration scheme of U.S. Pat. No. 3,909,392, the fluidizing gas in the dense phase zone of the regenerator may have a velocity in the range from about 0.2 to about 4 feet per second, and preferably about 0.5 to about 3 feet per second. The regeneration gas used to fluidize the dense phase zone contains molecular oxygen, and the oxygen is preferably charged to the regenerator in an amount somewhat in excess of that required for complete combustion of coke and carbon monoxide to carbon dioxide and water. The amount of oxygen in excess of that required for complete combustion of coke and carbon monoxide may vary from about 0.1 to about 25 or more percent of the stoichiometric oxygen requirement, but advantageously need not be greater than about 10 percent. Advantageously, the effluent gas from the regeneration zone contains from about 0.01 to about 0.5 volume percent of molecular oxygen. The concentration of oxygen and carbon monoxide at any point within the regeneration zone is, of course, maintained outside of the explosive range in order to eliminate any risk of detonation. Preferably, the concentration of carbon monoxide is maintained at a level below that of the explosive range.

Recovery processes may be utilized to recover heat contained in the regeneration zone effluent gases. Such processes include steam generation, heat exchange with various refinery streams, and employment in various drying or evaporation arrangements.

A highly preferred embodiment of the invention involves regenerating the modified catalyst in the presence of an oxidation promoter which serves to catalyze the oxidation of carbon monoxide to carbon dioxide within the regeneration zone. The temperature required to initiate and sustain combustion of the carbon monoxide may be lowered by as much as 100° F. through the use of such promoters. The oxidation promoter also serves to further improve the removal of sulfur oxides from the waste gas streams. Suitable oxidation promoters include one or more free or combined metallic elements selected from Groups IB, IIB, and III–VIII of the Periodic Table. Preferred oxidation promoters consist of free or combined metallic elements selected from the group consisting of ruthenium, osmium rhodium, silver, iridium, platinum, palladium, vanadium, and rhenium;

and more preferably are selected from the group consisting of palladium and platinum. The free metallic element, selected from these groups, or the oxides thereof are particularly suitable for use as the oxidation promoter. The catalyst must, however, be modified with at least one metal oxide capable of reacting with sulfur oxides, which is derived from a metallic element different from those of the oxidation promoter.

The oxidation promoter is utilized in sufficient amounts to accelerate the oxidation of carbon monoxide in said waste gas stream in the regeneration zone and thereby produce reduced concentrations of carbon monoxide in the waste gas stream. When the metallic element of the oxidation promoter is selected from the group consisting of ruthenium, rhodium, palladium, osmium, iridium, silver, platinum, and rhenium, the preferred amount, calculated as the metal, is in the range of from about 0.1 part per billion to about 0.1 weight percent, more preferably in the range from about 0.1 part per billion to about 50 parts per million, and most preferably in the range of from about 0.1 to about 10 parts per million, based on the weight of modified catalyst. When the metallic element of the oxidation promoter is vanadium, the preferred amount, calculated as vanadium, is in the range from about 10 parts per million to about 10%, more preferably in the range from about 50 ppm to about 0.1%, and most preferably in the range from about 50 ppm to about 250 ppm, based on the weight of modified catalyst.

The oxidation promoter may be confined in the regeneration zone, for example, in the form of a bar, mesh network, or screen, or as fluidizable solid particles which are enclosed within catalyst trays located in the regeneration zone. Alternatively, the oxidation promoter may be incorporated into or deposited onto the catalyst. In addition, fluidizable solid particles of the oxidation promoter, may be circulated through the cyclic cracking process together with the catalyst particles.

The techniques suitable for modification of fluidized cracking catalysts with metal oxides capable of reacting with sulfur oxides in the regeneration zone according to this invention may also be used to further modify the catalyst with the metals or metal oxides of the oxidation promoter. In addition, it is preferred to ion-exchange a crystalline aluminosilicate with a solution or solutions of a compound or compounds of the metal in the oxidation promoter and then incorporate the ion-exchanged product in a porous cracking catalyst matrix. Also useful is the ion-exchange of siliceous solids of clays with a solution or solutions of a compound or compounds of the metal in the oxidation promoter. Suitable compounds for use in ion exchange include the metal halides, preferably chlorides, nitrates, amine halides, oxides, sulfates, phosphates, and other water soluble inorganic salts, as well as the metal carboxylates and alcoholates of from 1 to 10 carbon atoms. Specific examples include palladium chloride, chloroplatinic acid, ruthenium penta-amine chloride, osmium chloride, perrhenic acid, dioxobis(ethylene diamine)rhenium (V) chloride, and rhodium chloride. Subsequent calcination or direct introduction of the ion-exchanged substrate into the catalytic cracking process cycle then affords the oxidation promoter of the invention.

The metallic element or elements of the oxidation promoter may enter into a complex chemical combination with the various components of the modified cracking catalyst. Consequently, use of the terms "oxidation promoter," "incorporated into," and "deposited onto" encompasses such complex chemical combination.

EXAMPLE 1

Two hundred grams of a calcined, equilibrium, commercially available molecular sieve-type cracking catalyst containing 5.3 percent of hydrogen and rare earth ion-exchanged, Y-type crystalline aluminosilicate and silica-alumina, which contained 30 weight percent of alumina, were impregnated with 3.90 grams of a 50 weight percent manganese nitrate solution and 210 milliliters of water. About 80 weight percent of the catalyst was in the 20 to 75 micro range in size. The impregnated catalyst particles were recovered and dried at 250° F., followed by calcination for 3 hours at 1,250° F. The resultant catalyst contained 0.3 weight percent of manganese.

EXAMPLE 2

The procedure of Example 1 was repeated, except that 1.265 grams of uranyl nitrate dissolved in 210 milliliters of water was employed as the impregnating solution. The impregnated catalyst was dried at 250° F., and then calcined for 3 hours at 1,200° F. The resultant catalyst contained 0.3 weight percent of uranium.

EXAMPLE 3

The procedure of Example 1 was repeated, except that 0.82 grams of ammonium metatungstate dissolved in 210 milliliters of water was employed as the impregnating solution. The catalyst was dried at 250° F., and then calcined for 3 hours at 1,200° F. The resultant catalyst contained 0.3 weight percent of tungsten.

EXAMPLE 4

The procedure of Example 1 was repeated, except that 2.35 grams of ceric ammonium nitrate dissolved in 200 milliliters of water was employed as the impregnating solution. The catalyst was dried and calcined as in Example 1 and contained 0.3 weight percent of cerium.

EXAMPLE 5

The procedure of Example 1 was repeated, except that 2.73 grams of zinc nitrate hexahydrate dissolved in 200 milliliters of water was employed as the impregnating solution. The catalyst was dried and calcined as in Example 1 and contained 0.3 weight percent of zinc.

EXAMPLE 6

The procedure of Example 1 was repeated, except that 4.35 grams of ferric nitrate dissolved in 200 milliliters of water was employed as the impregnating solution. The impregnated catalyst was dried and calcined as in Example 1 and contained 0.3 percent of iron.

EXAMPLE 7

The procedure of Example 1 was repeated, except that 1.1 grams of ammonium molybdate in a 210 milliliter aqueous solution was employed as the impregnating solution. The impregnated catalyst was dried at 250° F. for 3 hours, and then calcined at 1,200° F. for three hours. The resultant catalyst contained 0.3 weight percent of molybdenum.

EXAMPLE 8

The procedure of Example 1 was repeated, except that 5.0 grams of titanium sulfate dissolved in 25 milliliters of an aqueous 30 percent solution of hydrogen peroxide which was diluted to 200 milliliters with water was employed as the impregnating solution. The solution was heated until the titanium salt was fully dissolved. The catalyst was dried at 250° F. and then calcined for 3 hours at 1,200° F. The resultant catalyst contained 0.3 weight percent of titanium.

EXAMPLE 9

The procedure of Example 1 was repeated, except that 1.2 grams of chromic oxide dissolved in 200 milliliters of water was employed as the impregnating solution. The impregnated catalyst was dried for 3 hours at 250° F. and then calcined for 3 hours at 1,200° F. The resultant catalyst contained 0.6 weight percent of chromium.

EXAMPLE 10

The procedure of Example 1 was repeated, except that 2.12 grams of zirconyl chloride dissolved in 200 milliliters of water was employed as the impregnating solution. The impregnated catalyst was dried at 250° F. for 3 hours and then calcined for 3 hours at 1,200° F. The resultant catalyst contained 0.3 weight percent of zirconium.

EXAMPLE 11

The procedure of Example 1 was repeated, except that 0.2506 gram of a 50 percent manganese nitrate solution and 200 milliliters of water was employed as the impregnating solution. The impregnated catalyst was dried at 250° F. for 3 hours and then calcined for 3 hours at 1,200° F. The resultant catalyst contained 0.02 weight percent of manganese.

EXAMPLE 12

The procedure of Example 11 was repeated, except that 1.253 grams of a 50 percent solution of manganese nitrate in 210 milliliters of water was employed as the impregnating solution. The resultant catalyst contained 0.1 percent of manganese.

EXAMPLE 13

Fifty grams of an equilibrium, commercially available cracking catalyst, which has been calcined and was coke-free and contained 2-4 weight percent of molecular sieve in a silica-alumina matrix, was impregnated with a solution of 5.2 grams of magnesium nitrate trihydrate in 50 milliliters of water, sufficient to completely wet the cracking catalyst. The wetted catalyst was then dried at 250° F. for 3 hours and thereafter calcined at 1,000° F. for 3 hours. The catalyst contained 1 weight percent of magnesium.

EXAMPLE 14

The procedure of Example 13 was repeated, except that one-half the amount of magnesium nitrate was employed to provide a catalyst impregnated with 0.5 weight percent of magnesium.

EXAMPLE 15

Eighty pounds of an equilibrium, commercially available cracking catalyst, which had been calcined and was coke-free and contained 3.8 weight percent of molecular sieve in a silica-alumina matrix, was impregnated in three batches with 4.2 pounds of magnesium nitrate dissolved in 12 liters of water, sufficient to just fill the pore volume of the catalyst. The wetted catalyst was dried at 250° F. and subsequently calcined at 1,000° F. for 3 hours, to provide 0.5 weight percent of magnesium on the catalyst.

EXAMPLE 16

One hundred milligrams of chloroplatinic acid was dissolved in 1 liter of water, and 18 milliliters of this solution was diluted with enough water to wet 300 grams of an equilibrium, commercially available cracking catalyst which had been withdrawn from a commercial unit and then calcined at 1,000° F. for 5 hours and contained 2.5 weight percent of molecular sieve and 0.6 weight percent of sodium. The wetted catalyst was then dried at 250° F. for 3 hours and was calcined at 1,000° F. for 3 hours. The catalyst contained 6 parts per million by weight of platinum.

EXAMPLE 17

Ninety five grams of commercially available alumina was wetted with a solution of 3.22 grams of ammonium vanadate and 5 grams of oxalic acid in 95 milliliters of water, and was then dried at 250° F. for 3 hours and calcined at 1,000° F. for 3 hours. This vanadium-impregnated alumina was next wetted with a solution of 9.3 grams of copper nitrate in 95 milliliters of water. This wetted alumina was dried at 250° F. for 3 hours and calcined at 1,000° F. for 3 hours. The alumina contained 2.5 weight percent of vanadium and 2.5 weight percent of copper.

EXAMPLE 18

Ten grams of a solution of 6.9 grams of a lubricating oil additive which contained 9.2 weight percent of magnesium, distributed as magnesium hydroxide, magnesium carbonate, and magnesium polypropylbenzene sulfonate, dissolved in 33.1 grams of catalytic light cycle oil, was cracked in a bench scale cracking unit having a fluidized bed of 220 grams of an equilibrium, commercially available cracking catalyst which contained 2.5 weight percent of molecular sieve and about 0.6 weight percent of sodium and had been withdrawn from a commercial fluid catalytic cracking unit and then calcined. The cycle oil was cracked at 700° F. for 4 minutes. After purging the catalyst bed with nitrogen for 10 minutes at 1,250° F., the catalyst bed was cooled to 700° F., and the cracking-purging-regeneration cycle was repeated until the magnesium, zinc, and phosphorus contents of the catalyst reached the level of 1100, 703, and 59 parts per million, respectively. Zinc and phosphorus were inherently present.

EXAMPLE 19

The procedure of Example 18 was repeated, except that the cracking-purging-regeneration cycle was repeated with a 10g solution containing 6.5g of the oil and 3.5g of a lube oil additive containing 1.6 wt.% Zn, 1.3 wt.% P, and 4.6 wt.% Mg until the magnesium, zinc, and phosphorus contents of the catalyst reached 2400, 1200, and 1097 parts per million, respectively.

EXAMPLE 20

The procedure of Example 19 was repeated, except that an equilibrium, commercially available cracking catalyst which contained 3.3 weight percent of molecular sieve in a silica-alumina matrix and had also been withdrawn from a commercial fluid catalytic cracking unit and calcined was employed and the cracking-purging-regeneration cycle was repeated until the magnesium, zinc, and phosphorus contents of the catalyst reached 4600, 304, and 1136 parts per million, respectively.

EXAMPLE 21

A lubricating oil additive in the amount of 7.3 grams and containing 8.2 weight percent of magnesium, distributed as magnesium carbonate, magnesium hydroxide, and magnesium polypropylbenzene sulfonate, and a sufficient volume of xylenes was used to wet 2000 grams of an equilibrium, commercially available cracking catalyst which had been withdrawn from a commercial catalytic cracking unit and calcined and which contained 2.5 weight percent of molecular sieve in a silica-alumina matrix and about 0.6 weight percent of sodium. The wetted catalyst was dried at 400° F. for 3 hours and calcined at 1,000° F. for 20 hours. The catalyst contained 3000 parts per million of magnesium.

EXAMPLES 22-27

A bench scale laboratory regeneration unit was used to test the potency of a number of the impregnated catalysts of Examples 1-21 for providing reduced emissions of carbon monoxide in regeneration zone flue gases. A synthetic flue gas composed of 4 volume percent of each of carbon monoxide, oxygen, and water vapor, and 88 volume percent of nitrogen was passed at a rate of about 1,000 milliliters (measured at 60° F.) through a fixed fluidized bed of the molecular sieve-type cracking catalyst impregnated with a metal, which was maintained in a glass regenerator surrounded by a furnace to provide the desired regeneration temperature of 1,200° F. The temperature of the catalyst was measured by thermocouples. A cyclone was used to separate entrained catalyst from the gas exiting from the regenerator and to return the catalyst to the catalyst bed. The time during which the regenerator was operated at a given set of conditions ranged from about 40 to about 90 minutes in order to allow sufficient time to establish the oxidation state of the metal on the catalyst in an actual fluid catalytic cracking unit operation.

The gas exiting from the regenerator was analyzed with a gas chromatograph for oxygen, nitrogen, carbon monoxide, and carbon dioxide. The amount of carbon monoxide converted was determined as the difference between the carbon monoxide contents of the fresh synthetic gas mixture and of the gas exiting from the regenerator.

In Examples 22-26, the impregnated catalysts produced in Examples 1, 4, 5, 6, and 10 were used, and the volume percent of carbon monoxide converted was 65, 72, 55, 75, and 65, respectively. In Example 27, which employed the unimpregnated catalyst used in Examples 1, 4, 5, 6, and 10, the volume percent of carbon monoxide converted was 31.

EXAMPLES 28-31

Several of the above catalysts were tested according to standard uniform test methods used in the industry in a microfluidized catalytic unit to determine the desired selectivity for catalytic cracking. As a basis, in Example 28, the unimpregnated cracking catalyst used in Example 1 had a relative micro-activity of 154, a coke factor of 1.0, and a hydrogen-to-methane mole percent ratio of 0.64. In Example 29, the impregnated catalyst produced in Example 1 was employed and showed a relative micro-activity of 147, a coke factor of 1.1, and a hydrogen-to-methane mole percent ratio of about 1.1-1.2. In Example 30, the impregnated catalyst produced in Example 4 was used and demonstrated a relative micro-activity of 150, a coke factor of 1.1, and a hydrogen-to-methane mole percent ratio of 0.9-1.1. In Example 31, the catalyst produced in Example 6 was used and showed a relative activity of 134, a coke factor of 2.0, and a hydrogen-to-methane mole percent ratio of 6.5.

EXAMPLES 32-38

The procedure of Examples 22-27 was repeated, except that powdered metal oxides having a particle size of 5 microns and finer in admixture with the unimpregnated catalyst used in Example 1 were used in place of the impregnated catalysts. The powdered metal oxides, amounts thereof, and volume percent of carbon monoxide converted to carbon dioxide in Examples 32-35, as well as in comparative Example 36, which employed no metal oxide under otherwise identical conditions, are shown in Table 1. Similar data for Example 37 and its comparative Example 38, which employed no metal oxide under otherwise identical conditions, are also shown in Table 1.

TABLE 1

| Example | Metallic Oxide | Weight Percent of Metal Oxide In Catalyst | Volume Percent of Carbon Monoxide Converted |
|---|---|---|---|
| 32 | manganese dioxide | 1.0 | 46 |
| 33 | manganese dioxide | 2.0 | 51 |
| 34 | iron oxide | 0.3 | 34 |
| 35 | iron oxide | 1.0 | 35 |
| 36 | none | — | 28 |
| 37 | rare earth oxides | .1 | 65 |
| 38 | none | — | 33 |

EXAMPLES 39-40

The procedure of Examples 22-27 was repeated, except that a synthetic flue gas made up of 1500 parts per million of sulfur dioxide in a mixture of 4 volume percent of each of oxygen and steam in nitrogen at 1,250° F. was passed through the regenerator at 1,500 milliliters per minute (measured at 60° F.) and an ultra-violet analyzer was used to measure continuously the sulfur dioxide content of the effluent gas. Comparative tests were run using the unimpregnated catalyst used in Example 16 and the impregnated catalyst produced in Example 16. Example 39 involved the unimpregnated catalyst, while Example 40 involved the impregnated catalyst. The volume percents of sulfur dioxide removed from the regeneration zone flue gas are shown as a function of elapsed time after beginning the experiment in Table 2. The volume percent removed decreased with time as the catalyst surface became saturated. In Example 39, the sulfur level in the form of soluble sulfate on the catalyst was 55 parts per million before the experiment and 368 parts per million afterward, corresponding to recovery on the catalyst of 76 weight percent of the sulfur removed from the regeneration gas. In Example 40, the sulfur level in the form of soluble sulfate on the catalyst was 111 parts per million before the experiment and 733 parts per million afterwards, corresponding to recovery on the catalyst of 91 weight percent of the sulfur removed from the regeneration zone.

TABLE 2

| Example Time | Volume Percent of Sulfur Dioxide Removed ||||||||||
| --- | --- | --- | --- | --- | --- | --- | --- | --- | --- |
| | 39 | 40 | 41 | 42 | 43 | 44 | 45 | 46 | 47 |
| 0–10 | 86–70 | 98 | 100 | 82 | 78–63 | 85–82 | 92–91 | 36–24 | 60–49 |
| 10–20 | 70–52 | 98–95 | 100 | 57 | 63–43 | 82–78 | 91–89 | 24–16 | 49–39 |
| 20–30 | 52–43 | 95–85 | 100 | 48 | 43–32 | 78–74 | 89–88 | 16–14 | 39–33 |
| 30–40 | 43–35 | 85–76 | 100 | 43 | 32–27 | 74 14 70 | 88–87 | 14–13 | 33–30 |

EXAMPLES 41–42

The procedure of Examples 39–40 was repeated in comparative tests using mixtures of a molecular sieve-type cracking catalyst and different amounts of the vanadium- and copper-impregnated alumina produced in Example 17. In Example 41, 10 grams of the vanadium-and copper-impregnated alumina were mixed with 90 grams of an equilibrium, commercially available cracking catalyst which contained 3.3 weight percent of molecular sieve and which had been withdrawn from a commercial fluid catalytic cracking unit and calcined at 1,000° F. for 5 hours. The flow rate of the synthetic flue gas was 854 cubic centimeters/minute (measured at 60° F.).

In Example 42, 0.5 gram of the vanadium- and copper-impregnated alumina of Example 17 was mixed with 49.5 grams of the same calcined, equilibrium commercial cracking catalyst used in Example 41. The flow rate of the synthetic flue gas was 513 cubic centimeters/minute (measured at 60° F.). The volume percents of sulfur dioxide removed from the flue gas for Examples 41–42 are shown in Table 2.

EXAMPLES 43–47

The procedure of Examples 39–40 was repeated using a regeneration temperature of 1,250° F. Example 43 was a comparative test using a flow rate of the synthetic flue gas mixture of 1084 milliliters per minute and the unimpregnated equilibrium catalyst used in Examples 18–19, while Examples 44–45 involved the impregnated catalyst produced in Examples 18–19, respectively, and flow rates for the synthetic flue gas mixture of 989 and 1,014 milliliters per minute, respectively. Example 46 was a comparative test using the unimpregnated catalyst used in Examples 20, 41 and 42 and a flow rate of the synthetic flue gas mixture of 891 milliliters per minute. Example 47 involved the impregnated catalyst produced in Example 20 and a flow rate of the synthetic flue gas mixture of 992 milliliters per minute. The volume percents of sulfur dioxide removed from the flue gas for Examples 43–47 are shown in Table 2.

We claim:

1. In a process for the cyclic, fluidized, catalytic cracking of an organic feedstock of the type wherein said feedstock is subjected to cracking in a reaction zone with fluidized solid particles of a cracking catalyst; catalyst substantially deactivated by non-volatile coke deposits is separated from reaction zone effluent and stripped of volatile deposits in a stripping zone by contact with a stripping gas which contains steam; stripped catalyst particles are separated from stripping zone effluent and regenerated in a regeneration zone by combustion of the coke deposits with an oxygen containing gas; and regenerated catalyst particles are separated from regeneration zone effluent gas and recycled to the reaction zone, the improvement comprising:
   (a) conveying at least one waste gas stream containing sulfur oxides to said regeneration zone; and
   (b) contacting said waste gas stream with the catalyst particles in said regeneration zone, wherein the catalyst particles are modified with at least one metal oxide which reacts with sulfur oxides in the regeneration zone to form non-volatile sulfur compounds, and wherein said metal oxide is present in sufficient amount to reduce the concentration of sulfur oxides in said waste gas stream.

2. In a process for the cyclic, fluidized, catalytic cracking of an organic feedstock of the type wherein said feedstock is subjected to cracking in a reaction zone with fluidized solid particles of a cracking catalyst; catalyst substantially deactivated by non-volatile coke deposits is separated from reaction zone effluent and stripped of volatile deposits in a stripping zone by contact with a stripping gas which contains steam; stripped catalyst particles are separated from stripping zone effluent and regenerated in a regeneration zone by combustion of the coke deposits with an oxygen containing gas; and regenerated catalyst particles are separated from regeneration zone effluent gas and recycled to the reaction zone, the improvement comprising:
   (a) conveying at least one waste gas stream containing carbon monoxide and sulfur oxides to said regeneration zone; and
   (b) contacting said waste gas stream with the catalyst particles in said regeneration zone, wherein the catalyst employed is modified with at least one metal oxide which reacts with sulfur oxides in the regeneration zone to form non-volatile sulfur compounds, and wherein said metal oxide is present in sufficient amount to reduce the concentration of sulfur oxides in said waste gas stream;
   (c) mixing said waste gas stream with a molecular oxygen-containing gas in the regeneration zone; and
   (d) effecting substantially complete combustion of said carbon monoxide to carbon dioxide within said regeneration zone, wherein said modified catalyst particles are present in sufficient amount within said regeneration zone to absorb therein a major portion of the heat derived from combustion of said carbon monoxide and the coke deposits.

3. The process as set forth in claim 2 wherein said metal oxide is selected from the group consisting of the oxides of sodium, the Group IIA metals of the Periodic Table, scandium, titanium, chromium, iron, molybdenum, manganese, cobalt, nickel, antimony, copper, zinc, cadmium, lead and the rare earth metals.

4. The process as set forth in claim 2 wherein said metal oxide is selected from the group consisting of the oxides of sodium, calcium, and magnesium.

5. The process as set forth in claim 2 wherein said metal oxide is an oxide of sodium.

6. The process as set forth in claim 2 wherein said metal oxide is selected from the group consisting of the oxides of calcium and magnesium.

7. The process as set forth in claim 2 wherein the amount of metal oxide, calculated as the metal, is in the range of from about 10 parts per million to about 10 weight percent based on the combined weight of solid catalyst particles and metal oxide component.

8. The process as set forth in claim 2 wherein said metal oxide is incorporated into said catalyst particles.

9. The process as set forth in claim 2 wherein said metal oxide is deposited onto said catalyst particles.

10. The process as set forth in claim 2 wherein said modified catalyst comprises fluidizable solid particles of cracking catalyst in admixture with fluidizable particles, other than said catalyst, which contain said metal oxide.

11. The process as set forth in claim 2 wherein said catalyst contains from about 0.5 to about 50 weight percent of a crystalline aluminosilicate.

12. The process as set forth in claim 2 wherein said catalyst contains from about 0.5 to about 50 weight percent of a crystalline aluminosilicate distributed throughout a matrix composed of from about 10 to about 65 weight percent of alumina and from about 35 to about 90 weight percent of silica.

13. The process as set forth in claim 2 wherein said regeneration zone is maintained at a temperature within the range from about 1,050° to about 1,450° F.

14. The process as set forth in claim 2 wherein said waste gas stream containing carbon monoxide and sulfur oxides is derived from the combustion of sulfur containing fuels.

15. The process as set forth in claim 2 wherein said combustion of carbon monoxide is conducted in the presence of an oxidation promoter, and wherein said oxidation promoter is present in sufficient amount to accelerate the combustion of carbon monoxide.

16. The process as set forth in claim 15 wherein said oxidation promoter consists of at least one free or combined metallic element selected from Groups IB, IIB, and III–VIII of the Periodic Table; and wherein said catalyst is modified with at least one metal oxide capable of reacting with sulfur oxides which is derived from a metallic element different from those of the oxidation promoter.

17. The process as set forth in claim 15 wherein said oxidation promoter consists of at least one free or combined metallic element selected from the group consisting of ruthenium, osmium, rhodium, silver, iridium, palladium, platinum, vanadium, and rhenium.

18. The process as set forth in claim 15 wherein said oxidation promoter consists of at least one free or combined metallic element selected from the group consisting of ruthenium, rhodium, iridium, osmium, platinum, silver, palladium, and rhenium; and wherein the amount of said oxidation promoter, calculated as the metal, is in the range of from about 0.1 part per billion to about 0.1 weight percent based on the weight of modified catalyst.

19. The process as set forth in claim 15 wherein said oxidation promoter consists of free or combined vanadium, and wherein the amount of said oxidation promoter, calculated as vanadium, is in the range from about 10 ppm to about 10 weight percent based on the weight of modified catalyst.

20. The process as set forth in claim 15 wherein said oxidation promoter is incorporated into said catalyst particles.

21. The process as set forth in claim 15 wherein said oxidation promoter is deposited onto said catalyst particles.

22. The process as set forth in claim 15 wherein fluidizable solid particles of said oxidation promoter are circulated through said cyclic cracking process together with the catalyst particles.

23. The process as set forth in claim 15 wherein said oxidation promoter is confined in the regeneration zone.

24. The process as set forth in claim 2 wherein said effluent gas from the regeneration zone contains about 0.01 to about 0.5 volume percent of oxygen.

25. The process as set forth in claim 10 wherein the particles which contain said metal oxide are composed of a support into or onto which is incorporated said metal oxide, and wherein said support is selected from the group consisting of solids which are substantially inert to the cracking reaction.

26. The process as set forth in claim 25 wherein said support is selected from the group consisting of silica, alumina, and mixtures thereof.

* * * * *